(12) United States Patent
Chiang

(10) Patent No.: US 11,829,013 B2
(45) Date of Patent: Nov. 28, 2023

(54) OPTICAL ENVIRONMENTAL OSCILLATION DETECTING SYSTEM AND OPTICAL MEASURING METHOD USING THE SAME

(71) Applicants: INTERFACE TECHNOLOGY (CHENGDU) CO., LTD., Chengdu (CH); INTERFACE OPTOELECTRONICS (SHENZHEN) CO., LTD., Shenzhen (CN); INTERFACE OPTOELECTRONICS (WUXI) CO., LTD., Wu Xi (CN); GENERAL INTERFACE SOLUTION LIMITED, Miaoli County (TW)

(72) Inventor: Che Wen Chiang, Shenzhen (CN)

(73) Assignees: Interface Technology (Chengdu) Co., Ltd., Chengdu (CN); Interface Optoelectronics (Shenzhen) Co., Ltd., Guangdong (CN); Interface Optoelectronics (Wuxi) Co., Ltd., Wuxi (CN); General Interface Solution Limited, Miaoli County (TW)

(*) Notice: Subject to any disclaimer, the term of this patent is extended or adjusted under 35 U.S.C. 154(b) by 527 days.

(21) Appl. No.: 17/186,634

(22) Filed: Feb. 26, 2021

(65) Prior Publication Data
US 2022/0229319 A1 Jul. 21, 2022

(30) Foreign Application Priority Data
Jan. 19, 2021 (CN) .......................... 202110068462.7

(51) Int. Cl.
*G02F 1/13* (2006.01)
*G01N 21/21* (2006.01)
*G01N 21/49* (2006.01)

(52) U.S. Cl.
CPC .......... *G02F 1/1309* (2013.01); *G01N 21/21* (2013.01); *G01N 21/49* (2013.01); *G01N 2201/0231* (2013.01); *G01N 2201/121* (2013.01)

(58) Field of Classification Search
CPC ...... G01N 21/21; G01N 21/49; G01N 21/538; G01N 2201/0231; G01N 2201/121; G02F 1/13; G02F 1/1309
(Continued)

(56) References Cited

U.S. PATENT DOCUMENTS 10,126,163 B2 * 11/2018 Huignard ........... G01D 5/35364
2003/0071995 A1 * 4/2003 Kurata ................... G01B 11/26
356/364

* cited by examiner

*Primary Examiner* — John H Le
(74) *Attorney, Agent, or Firm* — Rosenberg, Klein & Lee

(57) ABSTRACT

An optical environment oscillation detection system and an optical measurement method using the same are provided. This system includes a laser light source, a polarizer, a liquid crystal (LC) element, an analyzer, and an optical sensor arranged in sequence. A polarization axis of the polarizer and that of the analyzer are respectively parallel to a first and a second axis direction being perpendicular to each other. When there is no environmental disturbance, the alignment of LC cells in the LC element has an original pretilt angle, and the optical sensor senses a first scattered light intensity of the laser beam outputted from the analyzer. When there is environmental disturbance, the alignment of the LC cells has a changed pretilt angle in relative to the original pretilt angle, and the optical sensor senses a second scattered light intensity of the laser beam outputted from the analyzer.

18 Claims, 6 Drawing Sheets

(58) Field of Classification Search
USPC .............................................................. 702/1
See application file for complete search history.

OPTICAL ENVIRONMENTAL OSCILLATION DETECTING SYSTEM AND OPTICAL MEASURING METHOD USING THE SAME

This application claims priority of Application No. 202110068462.7 filed in Mainland China (P.R.C.) on 19 Jan. 2021 under 35 U.S.C. § 119; the entire contents of all of which are hereby incorporated by reference.

BACKGROUND OF THE INVENTION

Field of the Invention

The present disclosure relates to applications of optical measurement, and more particularly, to an optical environmental oscillation detecting system capable of increasing the measuring accuracy.

Description of the Prior Art

In order to improve the illumination or projection quality of the light source, environmental factors of the light source are also considered in the oscillation measurement. In terms of electromagnetic measurements, variables such as capacitances, piezo-resistances and current can be used for and analysis, so as to obtain vibration parameters such as displacement, speed, acceleration of the object vibration. Regarding optical measurements, the Doppler effect of laser can be applied. Since it is certain for a vibrating object to move with a speed, the Doppler offset generated by using the laser beam to illuminate the measurement object can be utilized to measure the parameters of the measurement object, such as displacement, velocity, acceleration, etc. The main causes of optical environmental oscillations can be roughly classified as air disturbances, magnetic wave interferences, acoustic wave interferences, and micro-disturbances caused by temperature disturbances.

The prior art oscillation measurement can be roughly classified as eddy-current type, electrostatic capacitance type, piezoelectric type, Laser Doppler in, etc., wherein the eddy-current type oscillation measurement system uses high-frequency current through the sensor coil, making the measurement object generate the eddy current. The disadvantage of this approach is that the non-contacting measurement object must be a magnetic conductor. The electrostatic capacitance type oscillation measurement is to detect the capacitance between the sensor and the measurement object, but the disadvantage is that non-contacting measurement object needs to be an insulator. The piezoelectric oscillation measurement system uses piezoelectric materials to convert the force proportional to the acceleration into a voltage output, but the disadvantage is that the contacting measurement object must be an insulator. Moreover, the Laser Doppler oscillation measurement is applied to the detection of general environmental oscillations and the fineness thereof is also relatively poor, thus it is not suitable for the detection of micro-disturbances.

In view of the above, there is a need for a novel oscillation measurement method to improve the illumination or projection quality of the light source.

SUMMARY OF THE INVENTION

In view of the above needs, the present disclosure provides a simple implementation, which is achieved by a pure optical measurement method, which can be used for environmental micro-vibration detections, and can be equipped with high-precision measurement equipment to improve the accuracy and reliability of the instrument.

An embodiment of the present disclosure provides an optical environmental oscillation detecting system which comprises a laser light source, a polarizer, an analyzer, a liquid crystal (LC) element and an optical sensor. The laser light source is arranged to provide a laser beam. The polarizer is arranged on one side of the laser light source that outputs the laser beam, wherein the polarizer is arranged to receive the laser beam, and a polarization axis of the polarizer is parallel to a first axial direction. The analyzer is arranged on one side of the polarizer that is deviates from the laser light source, wherein a polarization axis of the analyzer is parallel to a second axial direction, and the second axial direction is perpendicular to the first axial direction. The LC element is arranged between the polarizer and the analyzer, wherein the LC element is arranged to receive the laser beam from the polarizer, and output the laser beam to the analyzer. The optical sensor is arranged on one side of the analyzer that deviates from the LC element, to receive the laser beam outputted from the analyzer. When there is no environmental disturbance, an alignment of LC cells in the LC element has an original pretilt angle, and when the LC element is in the dark mode, the optical sensor senses a first scattered light intensity of the laser beam outputted from the analyzer in the; and when there is environmental disturbance, the alignment of the LC cells has a changed pretilt angle in relative to the original pretilt angle, and when the LC element is in the dark mode, the optical sensor senses a second scattered light intensity of the laser beam outputted from the analyzer in the.

According to an embodiment of the present disclosure, the optical environmental oscillation detecting system further comprises an analysis device, wherein the optical sensor is coupled to the analysis device, and the analysis device is arranged to receive the first scattered light intensity and the second scattered light intensity, in order to calculate at least one environmental oscillation factor according to variations of the first scattered light intensity and the second scattered light intensity.

According to an embodiment of the present disclosure, the analysis device is further coupled to a measuring instrument, and the measuring instrument is arranged to receive said at least one environmental oscillation factor, in order to deduct said at least one environmental oscillation factor from measurement statistics of the measuring instrument, for performing interference source corrections.

According to an embodiment of the present disclosure, when the LC element is operated in an extraordinary light state, an optical axis of the LC element is parallel to the first axial direction.

According to an embodiment of the present disclosure, when the LC element is operated in the extraordinary light state, the first axial direction is an X-axis direction, the second axial direction is a Y-axis direction, and a scattered light intensity of the LC element under the dark mode meets the following equation:

$$I^e_{scattered}(\theta_{ref}) = \frac{\pi^2}{\lambda^4 k_0^2}(\Delta\varepsilon)^2 k_B T \left\{ \frac{(n_o\sin\theta_f)^2}{K_{11}\{(n_o\cos\theta_f - n_{eff})^2 + (n_o\sin\theta_f)^2\}^2} + \frac{(n_o\cos\theta_f - n_{eff})^2}{K_{22}\{(n_o\cos\theta_f - n_{eff})^2 + (n_o\sin\theta_f)^2\}^2} \right\}$$

wherein $I_{scattered}^e$ denotes the scattered light intensity of the LC element under the extraordinary light state, $\theta_{ref}$ denotes a refraction angle, ε denotes a dielectric constant, $k_0$ is a preset constant, T denotes a temperature, $K_{11}$ is a preset coefficient, $K_{22}$ denotes a twist elastic coefficient, $n_{eff}$ denotes an effective refractive index, $\theta_f$ denotes a final deflection angle, $k_B$ denotes the Boltzmann constant, λ, denotes a wavelength of the scattered light, $n_0$ denotes a medium refractive index.

According to an embodiment of the present disclosure, wherein when operating in an ordinary light state, an optical axis of the LC element is perpendicular to the first axial direction.

According to an embodiment of the present disclosure, when operating in the ordinary light state, the first axial direction is the Y-axis direction, the second axial direction is the X-axis direction, and a scattered light intensity of the LC element under the dark mode meets the following equation:

$$I_{scattered}^o(\theta_{ref}) = \frac{\pi^2}{\lambda^4 k_0^2}(\Delta\varepsilon)^2 k_B T \left( \frac{\cos^2\theta_f}{k_{22} \times (n_{eff}\cos\theta_f - n_o)^2 + k_{33} \times (n_{eff}\sin\theta_f)^2} \right)$$

wherein $I_{scattered}^o$ denotes the scattered light intensity under the ordinary light state, $\theta_{ref}$ denotes a refraction angle, ε denotes a dielectric constant, $k_0$ is a preset constant, T denotes a temperature, $K_{22}$ denotes a twist elastic coefficient, $K_{33}$, denotes a bending deformation elastic coefficient, $n_{eff}$ denotes an effective refractive index, $\theta_f$ denotes a final deflection angle, $k_B$ denotes the Boltzmann constant, λ denotes a wavelength of the scattered light, $n_0$ denotes a medium refractive index.

According to an embodiment of the present disclosure, a scattered light intensity of the LC element under the dark mode declines linearly with the variation of the angle of the LC cells therein.

According to an embodiment of the present disclosure, the optical environmental oscillation detecting system further comprises a rotative heating platform and a controller, wherein the LC element in arranged on the rotative heating platform, and the controller is coupled to the rotative heating platform.

In addition to the above optical environmental oscillation detecting system, the present disclosure further provides an optical measurement method. The optical measurement method comprises the following steps: using a laser light source to provide a laser beam under a dark mode; using a polarizer to receive the laser beam from the laser light source and output the laser beam, wherein a polarization axis of the polarizer is parallel to a first axial direction; using an LC element to receive the laser beam from the polarizer and output the laser beam; using an analyzer to receive the laser beam from the LC element and output the laser beam, wherein a polarization axis of the analyzer is parallel to a second axial direction, and the second axial direction is perpendicular to the first axial direction; and using an optical sensor to receive the laser beam from the analyzer. When there is no environmental disturbance, an alignment of LC cells in the LC element has an original pretilt angle, and in the dark mode, the optical sensor senses of a first scattered light intensity of the laser beam outputted from the analyzer; and when there is environmental disturbance, the alignment of the LC cells has a changed pretilt angle in relative to the original pretilt angle, and the optical sensor senses a second scattered light intensity of the laser beam outputted from the analyzer.

According to an embodiment of the present disclosure, the optical measurement further comprises: using an analysis device to receive the first scattered light intensity and the second scattered light intensity, in order to calculate at least one environmental oscillation factor according to variations of the first scattered light intensity and the second scattered light intensity.

According to an embodiment of the present disclosure, the optical measurement further comprises: using a measuring instrument to receive said at least one environmental oscillation factor, in order to deduct said at least one environmental oscillation factor from measurement statistics of the measuring instrument, for performing interference source corrections.

In view of the above, the present disclosure may control the polarization axis of the polarizer to be parallel to the optical axis of the LC element in the extraordinary light state, and may control the polarization axis of the polarizer to be perpendicular to the optical axis of the LC element in the ordinary light state. The present disclosure may further use corresponding directive disturbance equations for measurement analysis, and perform environmental oscillation analysis according to the measurement and analysis result. The analytical statistics are sent back to high-precision measuring equipment in order to filter out said at least one environmental oscillation factor to increase the precision and reliability of instruments. Moreover, since the present disclosure adopts a pure optical method using the directive disturbance characteristics of the LC cells to realize the environmental oscillator, the desired effects can be achieved by using simple elements, such as a tilted homogeneous alignment (THA) sample, a laser light source, a polarizer, an analyzer and an optical sensor. Without the use of expensive equipment, the present disclosure has advantage on costs. With the combination of the present disclosure and the high-precision measurement equipment, environmental oscillation factor signals can be obtained to remove the impact of the environmental oscillation, thus improving the authenticity and stability of measurement statistics.

DETAILED DESCRIPTION OF THE INVENTION

Figure 1:
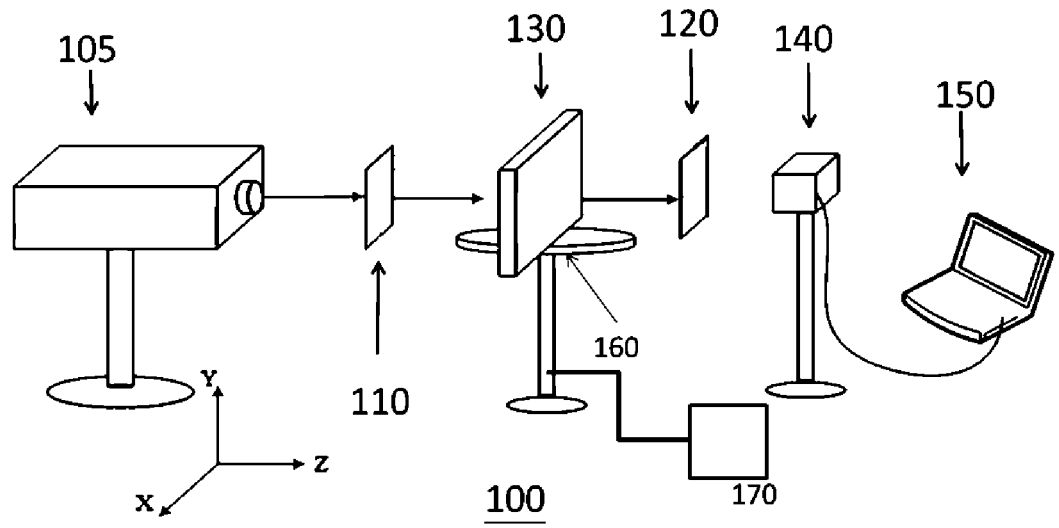
FIG. 1 is a diagram illustrating an optical environmental oscillation detecting system according to an embodiment of the present disclosure.

Following examples are used to describe the present invention, but they are only for illustrative objectives. Those skilled in the art may readily observe that various modifications and alterations of the device and method may be made without departing from the spirit and the scope of the invention. Hence, the claimed scope of the present disclosure should be based on the claims defined hereinafter. Throughout specification and the claims, except for those further defined in the content, the meaning of the terms "a" and "the" may include the meaning of "one or at least one" element or component. Moreover, throughout the specification and claims, the singular terms may also refer to plural elements or components, unless the context clearly specifies that the plural usage is excluded. In the whole specification and claims, unless the content clearly specifies the meaning of some terms, the meaning of the term "wherein" includes the meaning of in/on something/somewhere". The meaning of each term used in the present claims and specification refers to a usual meaning known to one skilled in the art unless the meaning is additionally annotated. Some terms used to describe the present invention will be discussed to guide practitioners to realize the present invention. Further, various embodiments in the specification in are not meant to limit the claimed scope of the present invention.

The terms "substantially," "around," "about" and "approximately" can refer to a predetermined value, or a value difference within 20% or preferably within 10%. In addition, the quantities provided herein can be approximate, such that the terms "around," "about" and "approximately" cab be used if the value or range is not further specified. When a quantity, density, or other values or parameters has a designated range, better range or listed ideal values, it should be viewed as including the range with any upper/lower limit or an identical value, no matter the range is disclosed or not. For example, if it is described that the length of a component is X cm to Y cm, it is equivalent to the sentence "the length of the component is H cm, in which H can be any real number between X and Y."

In addition, the term "electrically coupled" can refer to either directly connections or indirectly connections between elements. Hence, if it is described in the contents of the present invention below that a first device is electrically coupled to a second device, the first device can be either directly connected to the second device, or indirectly connected to the second device through other devices or means. Moreover, as far as the transmissions or generations of electrical signals are mentioned, one skilled in the art should understand some degradations or unwanted transformations could be generated during the operations. However, if it is not specified in the specification, an electrical signal at the transmitting end should be viewed as substantially the same as that at the receiving end. For example, when the end A of an electrical circuit provides an electrical signal S to the end B of the electrical circuit, the voltage of the electrical signal S may drop due to passing through the source and drain of a transistor or due to some possible parasitic capacitance. However, the objective of this design is not meant to achieve some specific technical effects by deliberately using the degradation generated during the transmission. The electrical signals S at the end A should be viewed as substantially the same as that at the end B.

Furthermore, it can be understood that the terms "comprising," "including," "having," "containing," and "involving" are open-ended terms, which refer to "may include but is not limited to." In addition, each of the embodiments or claims of the present invention is not necessary to achieve all possible advantages and features. Further, the abstract and title of the present invention is used to assist the patent searching, rather than limiting the claimed scope of the present invention.

The main objective of the present disclosure is to detect the light leakage state of the LCD panel, and to design a measuring instrument that can eliminate environmental factors that disturb the measurement, in order to improve the measurement accuracy. This invention adopts a pure optical method, using the directional disturbance characteristics of LC cells, and only requires simple optical elements to achieve the desired effects.

The aforementioned optical elements may include a tilted homogeneous alignment (THA) LC element, a laser light source, a polarizer, an analyzer, and an optical sensor, which can implement the environmental oscillation measurement. Other high-precision optical measuring instruments might be further used (e.g. the Zygo Dynafiz, semiconductor high-precision optical measuring instrument, etc.) to cancel said at least one environmental oscillation factor, so as to realize a high-precision environmental oscillation measurement device and to improve the quality of optical objects. The cancelation of said at least one environmental oscillation factor may include the interference source correction which further includes adjusting a rotation angle, an interval, and a pretilt angle of the LC cells of the LC element. The environmental vibration measurement results can be combined with the measurement results of high-precision measurement equipment for post-processing in order to eliminate the impact of environmental vibrations, thereby enhancing the authenticity and stability of measurement statistics. Regarding the scattered light intensity of the LC element in dark mode, with the rotation of the LC cells after the voltage is applied, the pretilt angle of the LC cells decreases linearly, and the change of the pretilt angle has a positive correlation with the environmental oscillation. Since the present disclosure uses the directive disturbance characteristics of the LC cells, the optical axis will be disturbed due to the environmental oscillation. Therefore, the derived equation of the scattering intensity of the THA LC element under the dark mode can be used to analyze the environmental oscillation of the extraordinary light state (briefed as e-mode) and the ordinary light state (briefed as o-mode). Under the environmental disturbance, the LC optical axis causes the dynamic disturbance variation of the pretilt angle. This dynamic variation can be measured and analyzed by the optical sensor. The THA LC cells can be in the horizontal alignment (HA) or the vertical alignment (VA), wherein the use of vertical alignment of the LC cells provides high accuracy for environmental oscillation instruments.

Please refer to FIG. 1, which is a diagram illustrating an optical environmental oscillation detecting system according to an embodiment of the present disclosure. As shown in FIG. 1, the optical environmental oscillation detecting system 100 includes a laser light source 105, a pair of a polarizer 110 and analyzer 120 with polarization axes perpendicular to each other, a LC element 130, an optical sensor 140, an analysis device 150, a platform 160 and a controller 170. The laser light source 105 is arranged to provide a highly stable light source, the optical sensor 140 is arranged to detect a directive scattered light intensity, and the analysis device 150 is used to analyze a measured directive disturbance light intensity. In dark mode, the scattered light intensity of the LC cells will decrease linearly with the increase of the angle between the LC cell and the substrate. The variation of the LC angle has a positive correlation with the environmental oscillation, and thus the environmental oscillation can be obtained by reversing the change of the light intensity factor. In this embodiment, the analysis device 150 may be a computer. For better comprehension, the element 150 is called as the computer hereinafter. In addition, in another embodiment (not shown in a figure), the analysis device 150 can be a cloud server or a handheld electronic device such as a mobile phone or a tablet, but the present invention is not limited thereto.

The above-mentioned "homogeneous" means that the alignment of each layer of LC cells has the same pretilt angle. In addition, the scattered light of the LC molecules is depolarized, and the size of the scattered light is related to the pretilt angle and environmental oscillation. The laser light source 105 is arranged to provide a laser beam with the wavelength in a specific range, for example, it can be a variety of visible laser light with the wavelength preferably between 400-780 nm, such as 633 nm. The LC optical axis of the LC element 130 has directive disturbance characteristics. The polarizer 110 is arranged between the laser light source 105 and the LC element 130, and the polarization axis of the polarizer 110 is parallel to a first axial direction. The optical sensor 140 is arranged to detect the intensity of the directive disturbance light of the LC element 130 under a dark mode. In FIG. 1, the light-traveling direction is defined as the Z-axis direction, the vertical direction is defined as the Y-axis direction, and the horizontal direction is defined as the X-axis direction. The polarizer 110 and the analyzer 120 are perpendicular to each other. In the dark mode, the incident light cannot penetrate the analyzer 120. The polarization direction of the scattered light generated by the laser light through the LC element is perpendicular to the incident light, so that the scattered light can penetrate the analyzer, and the optical sensor 140 receives the scattered light intensity under the dark mode. The light intensity refers to the number of photons received per unit time and per unit area. Because the variation of the angle between the LC cells and the substrate is positively correlated with the environmental oscillation, at least one environmental oscillation factor can be calculated by reversing the variation amount of the light intensity.

The platform 160 can be a rotative heating platform, and can perform operations such as rotation and heating according to the controller 170 which is coupled to the platform 160. The purpose of heating is to control the temperature and to make the overall measurement more accurate. The use of the platform 160 is to heat the LC element so that the performance of the LC element 130 (in particular, the LC cells thereof) under different temperatures can be measured. Further, since the platform 160 is rotatable, an 360 degree measurement of the LC element can be realized.

When the light transmission mode of the LC element 130 is the extraordinary light state or the ordinary light state, a directive disturbance equation of any tilted incident light passing through the LC element 130 can be derived accordingly. In some embodiments of the present disclosure, the LC element 130 may adopt a vertical alignment or a horizontal alignment. The scattered light intensity of the LC element 130 under the dark mode declines linearly with the variation of the angle of the LC cells thereof. The reason for adopting the vertical alignment is due to the LC cells having the largest pretilt angle. The smaller the pretilt angle, the greater the measurement fluctuation will be. The pretilt angle of the LC cells in the vertical alignment is 90 degrees, and the pretilt angle of the LC cells in the horizontal alignment is 0 degrees.

In the absence of environmental disturbance, the alignment of the LC element 130 make the LC cells have an original pretilt angle. To check light leakage, when the LC element 130 is measured in a dark mode, a first scattered light intensity can be obtained by detecting the laser light passing through the LC element 130 and the pair of the polarizer 110 and the analyzer 120 with the optical sensor 140. When there is environmental disturbance, the original pretilt angle is changed and then becomes a varied pretilt angle. Thus, a second scattered light intensity can be obtained by detecting the laser light passing through the LC element 130 and the pair of the polarizer 110 and the analyzer 120 with the optical sensor 140.

Figure 2:
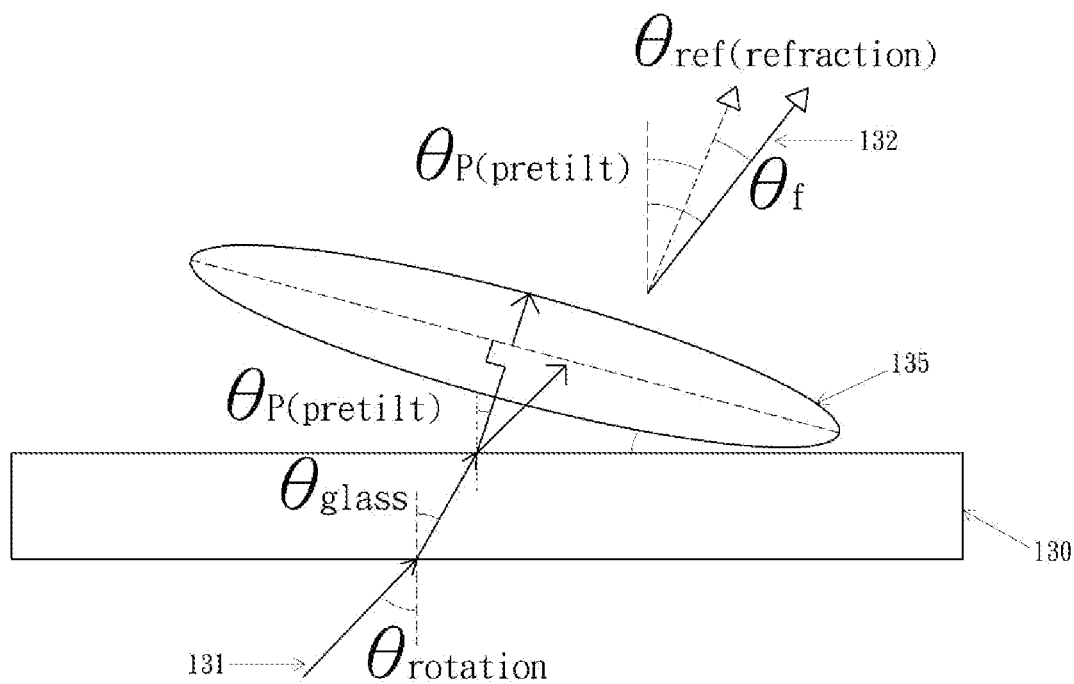
FIG. 2 is a diagram illustrating light emitting through an LC element.

Please refer to FIG. 2, which is a diagram illustrating light emitting through the LC element 130. As shown in FIG. 2, the glass angle $\theta_{glass}$ (the angle between the incident light 131 and the normal line, wherein the normal line is represented by a dashed line in this figure), the pretilt angle $\theta_p$ (i.e. $\theta_{pretilt}$) of the LC cell 135, and the final deflection angle $\theta_{ref}$ (i.e. $\theta_{refraction}$, which is the angle between the polarized light 132 and the normal line) may be obtained according to Equation (1) and Equations (2):

$$\theta_{glass} = \sin^{-1}\left(\frac{\sin\theta_{rotation}}{n_{glass}}\right), \quad \text{Equation (1)}$$

$$\theta_{ref(refraction)} = \sin^{-1}\left(\frac{n_{glass}\sin\theta_{glass}}{n_{eff}}\right),$$

$$\theta_f = |\theta_{p(pretilt)} - \theta_{ref}|, \quad \text{Equation (2)}$$

wherein $\theta_{rotation}$ denotes the rotation angle.

The equivalent refractive index $n_{eff}$ may be obtained by Equation (3) as follows:

$$n_{eff} = (\cos^2\theta_f n_e^2 + \sin^2\theta_f n_o^2)^{-0.5} \quad \text{Equation (3)}$$

wherein $n_e$, $n_o$ are refractive indexes under the extraordinary light state and the ordinary light state, respectively.

Figure 3:
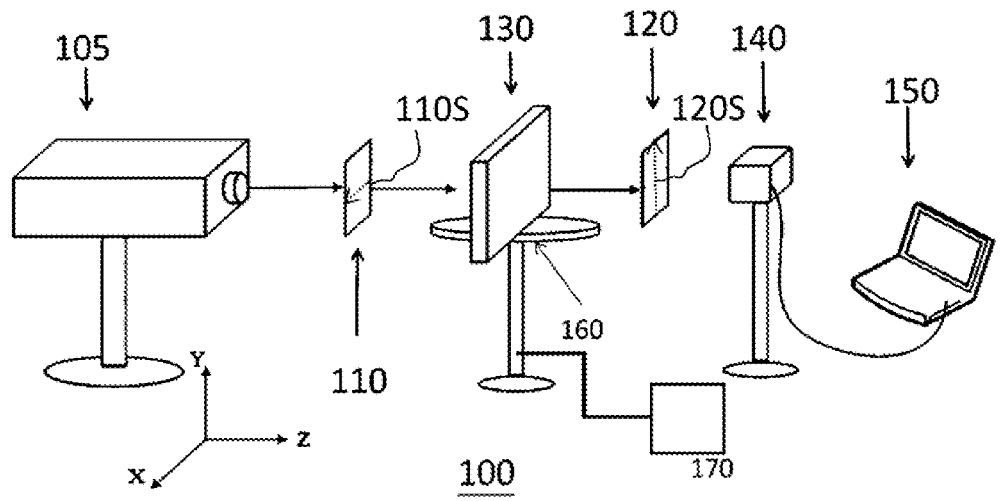
FIG. 3 is a diagram illustrating the calculation of vectors under the extraordinary light state.
Figure 4:
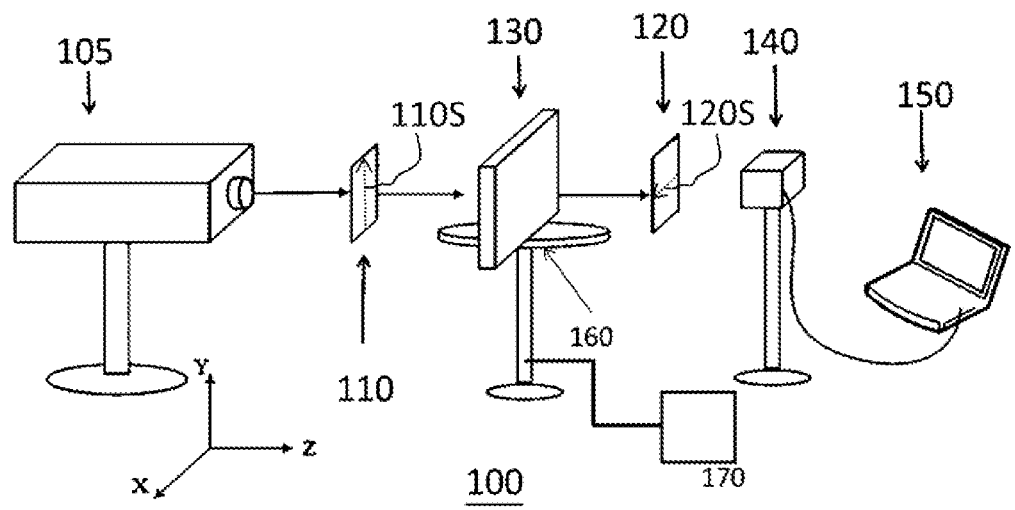
FIG. 4 is a diagram illustrating the calculation of vectors under the ordinary light state.

Please refer to FIG. 3 and FIG. 4, which are diagrams illustrating the calculation of vectors i, f, and q under the extraordinary light state (e-mode) and the ordinary light state (o-mode) respectively. The vector q under the extraordinary light state may be obtained according to Equation (4):

$$q_{//} = q_z, q_\perp = \sqrt{q_x^2 + q_y^2}, \quad \text{Equation (4)}$$

wherein $q_{//}$ denotes the horizontal component of the vector q, and $q_\perp$ denotes the vertical component of the vector q. The axial direction of the polarizer is parallel to the optical axis (i.e. the axis of the length) of the LC cells under the extraordinary light state, and the axial direction of the polarizer is perpendicular to the optical axis of the LC cells under the ordinary light state.

The vector $q_{//}$ and $q_\perp$, and the equivalent vector $k_{eff}$ may be obtained according to Equation (5) and Equation (6) respectively as follows:

$$q_{//} = k_0(n_{eff}\sin\theta_f), \quad q_\perp = k_0(n_{eff}\cos\theta_f - n_O) \quad \text{Equation (5)}$$

$$\overline{k_-} = k_0 n_o, \overline{k_{\bar{z}}} = k_0 n_{eff}, k_0 = \frac{2\pi}{\lambda}, \quad \text{Equation (6)}$$

Finally, the scatter light intensity of the THA LC element under the dark mode may be obtained according to Equation (7):

$$\frac{d\sigma(Power_{out}/\text{solid angle})}{d\Omega(Power_{in}/\text{unit area of incident beam})} = \left(\frac{\pi^2(\Delta\varepsilon)^2}{\lambda^4}\right)k_BT\sum_{\alpha=1,2}\frac{(i_\alpha f_z + i_z f_\alpha)^2}{K_{33}q_{//}^2 + K_{\alpha\alpha}q_\perp^2} \quad \text{Equation (7)}$$

wherein the unit of the parameter dσ is the output power (Power$_{out}$) divided by the solid angle, and the unit of the parameter dΩ is the input power (Power$_{in}$) divided by the unit area of the incident beam. Through the above parameters, the relationship among the vectors I, f, q and the axes X, Y, Z can be obtained, as shown in Table (1).

TABLE 1

|   | X | Y | Z |
|---|---|---|---|
| I | 0 | 0 | 1 |
| f | sinθ$_f$ | cosθ$_f$ | 0 |
| q | k$_0$ − k$_{eff}$ · cosθ$_f$ | k$_0$ · sinθ$_f$ | 0 |

Table (2) shows the relationship among the refractive indexes n$_c$ and n$_o$, the wavelength and the elastic constant under the extraordinary light state and the ordinary light state, respectively.

TABLE 2

| Refractive index | | Wavelength λ (nm) | Elastic constant (pN) | |
|---|---|---|---|---|
| n$_e$ | 1.5695 | 633 | K33 | 14.9 |
| n$_o$ | 1.4795 | | | |

Figure 5:
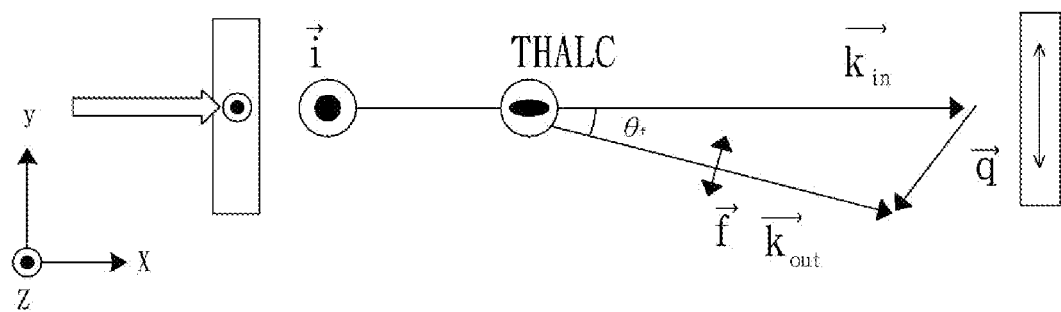
FIG. 5 is a diagram illustrating the measurement of the scattered light when the transmission mode of a laser beam is in the ordinary light state according to an embodiment of the present disclosure.

Please refer to FIG. 5, which is a diagram illustrating the measurement of the scattered light under the ordinary light state according to an embodiment of the present disclosure. In this embodiment, the polarization axis of the polarizer 110 is parallel to the Y-axis and the polarization axis of the analyzer 120 is parallel to the X-axis, for performing the measurement of the light under the ordinary light state. In the ordinary light state, the intensity of the scattered light of the LC element (expressed by "THALC" in FIG. 5) under the dark mode can be expressed by Equation (8) as follows:

$$I_{scattered}^o(\theta_{ref}) = \quad \text{Equation (8)}$$
$$\frac{\pi^2}{\lambda^4 k_0^2}(\Delta\varepsilon)^2 k_B T\left(\frac{\cos^2\theta_f}{k_{22}\times(n_{eff}\cos\theta_f - n_o)^2 + k_{33}\times(n_{eff}\sin\theta_f)^2}\right)$$

wherein $I_{scattered}^o$ denotes the scattered light intensity under the extraordinary light state, θ$_{ref}$ denotes a refraction angle, ε denotes a dielectric constant, k$_0$ is a preset constant, T denotes a temperature, K$_{22}$ denotes a twist elastic coefficient, K$_{33}$ denotes a bending deformation elastic coefficient, n$_{eff}$ denotes an effective refractive index, θ$_f$ denotes a final deflection angle, k$_B$ denotes the Boltzmann constant, λ denotes a wavelength of the scattered light, and n$_0$ denotes a medium refractive index. The vectors k$_{in}$, k$_{not}$, and q construct a triangle relationship to be calculated the light ratio, wherein k$_{in}$ is an incoming light vector, and k$_{out}$ is an outgoing light vector.

Using the optical sensor 140 for measurement and the analysis device 150 for calculation with Equation (1), the analysis device 150 can accordingly word out the scattered light intensity of the LC element under both the dark mode and the ordinary light state. With this information, high-precision instruments such as Zygo Dynafiz (the laser interferometer produced by ZYGO DynaFiz™) can perform the environmental oscillation analysis and filter out environmental oscillations to improve the accuracy and reliability of the instruments.

Figure 6:
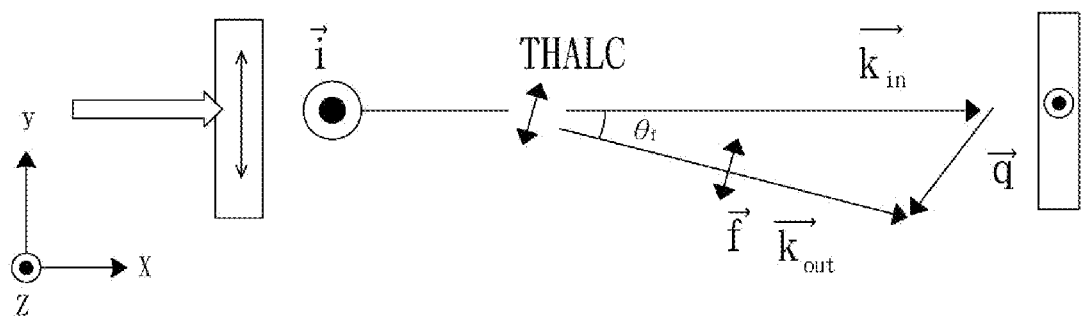
FIG. 6 is a diagram illustrating the measurement of the scattered light when the transmission mode of a laser beam is in the extraordinary light state according to an embodiment of the present disclosure.

Please refer to FIG. 6, which is a diagram illustrating the measurement of the scattered light under the extraordinary light state according to an embodiment of the present disclosure. In this embodiment, the polarization axis of the polarizer is parallel to the X-axis and the polarization axis of the analyzer 120 is parallel to the Y-axis, for performing the measurement of the laser beam when the transmission is under the ordinary light state. The scattered light intensity of the LC element (expressed by "THALC" in FIG. 6) under both the dark mode and the ordinary light state can be expressed by Equation (9) as follows:

$$I_{scattered}^e(\theta_{ref}) = \quad \text{Equation (9)}$$
$$\frac{\pi^2}{\lambda^4 k_0^2}(\Delta\varepsilon)^2 k_B T\left\{\frac{(n_o\sin\theta_f)^2}{K_{11}\{(n_o\cos\theta_f - n_{eff})^2 + (n_o\sin\theta_f)^2\}^2} + \frac{(n_o\cos\theta_f - n_{eff})^2}{K_{22}\{(n_o\cos\theta_f - n_{eff})^2 + (n_o\sin\theta_f)^2\}^2}\right\}$$

wherein $I_{scattered}^e$ denotes the scattered light intensity under the extraordinary light state, θ$_{ref}$ denotes a refraction angle, ε denotes a dielectric constant, k$_0$ is a preset constant, T denotes the temperature, K$_{11}$ is a preset coefficient, K$_{22}$ denotes a twist elastic coefficient, n$_{eff}$ denotes an effective refractive index, θ$_f$ denotes a final deflection angle, k$_B$ denotes the Boltzmann constant, λ denotes a wavelength of the scattered light, and n$_0$ denotes a medium refractive index. The vectors k$_{in}$, k$_{out}$, q construct a triangle relationship to be calculated the light ratio, wherein k$_{in}$ is the incoming light vector, and k$_{out}$ is the outgoing light vector.

Figure 7:
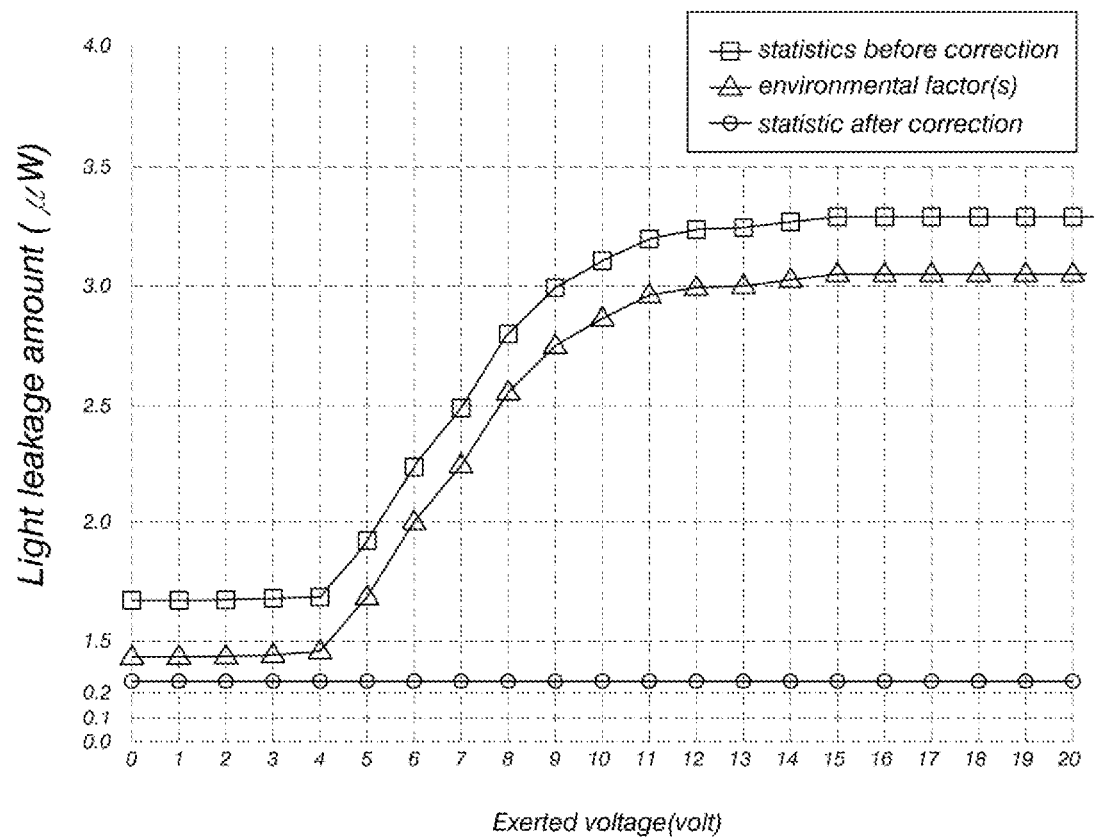
FIG. 7 is a graph illustrating the actual use of the measurement results of the present disclosure to deduct said at least one environmental oscillation factor.

Please refer to FIG. 7, which is a graph illustrating the actual use of the measurement results of the present disclosure to deduct at least one environmental oscillation factor, wherein the vertical axis denotes a light leakage amount (μW), and the horizontal axis denotes an exerted voltage (Volt). As the curves show, the statistic after correction is the statistics before correction minus the light leakage component, wherein the curved expressed in "□" represents the statistics before correction, the curved expressed in "Δ" represents the environmental factor(s), and the curve expressed in "O" represents the statistic after correction. As shown in FIG. 7, using the present disclosure to perform correction may eliminate environment impacts, thereby greatly improving the light leakage amount.

Figure 8:
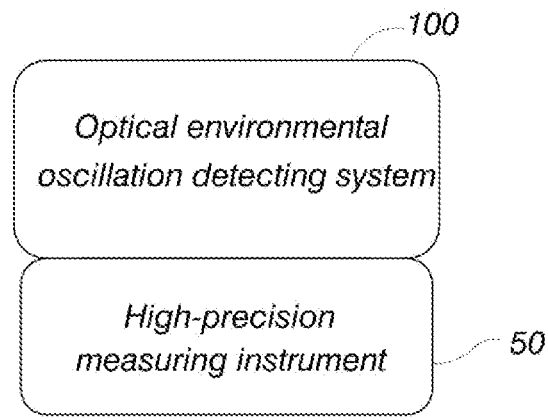
FIG. 8 is a diagram illustrating connecting optical environmental oscillation detecting system in FIG. 1 to a measuring instrument.
Figure 9:
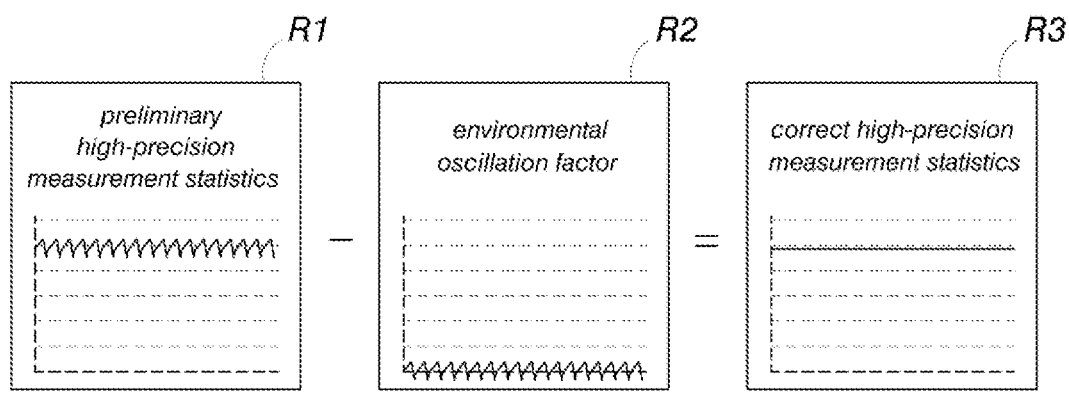
FIG. 9 is a diagram illustrating performing interference source correction on measurement statistics of the measuring instrument in FIG. 8.

FIG. 8 is a diagram illustrating connecting optical environmental oscillation detecting system in FIG. 1 to a measuring instrument. Please refer to FIG. 1 and FIG. 8, the optical environmental oscillation detecting system 100 in FIG. 1 may be connected to a measuring instrument (e.g. the high-precision measuring instrument 50). For example, the analysis device 150 may be further coupled to the high-precision measuring instrument 50, allowing the high-precision measuring instrument 50 to receive at least one environmental oscillation factor from the analysis device 150. FIG. 9 is a diagram illustrating performing interference source correction on measurement statistics of the measuring instrument in FIG. 8. Please refer to FIG. 8 and FIG. 9, the preliminary high-precision measurement statistics R1 of the high-precision measuring instrument 50 can be deducted by said at least one environmental oscillation factor R2 received from the optical environmental oscillation detecting system 100 to obtain the correct high-precision measurement statistics R3, which may be further used to perform the interference source correction. The interference sources may include: the micro-disturbances resulted from the thermal expansion in air, air circulation, sound wave interferences, movement of staffs, operational interferences of machine components, etc.

Figure 10:
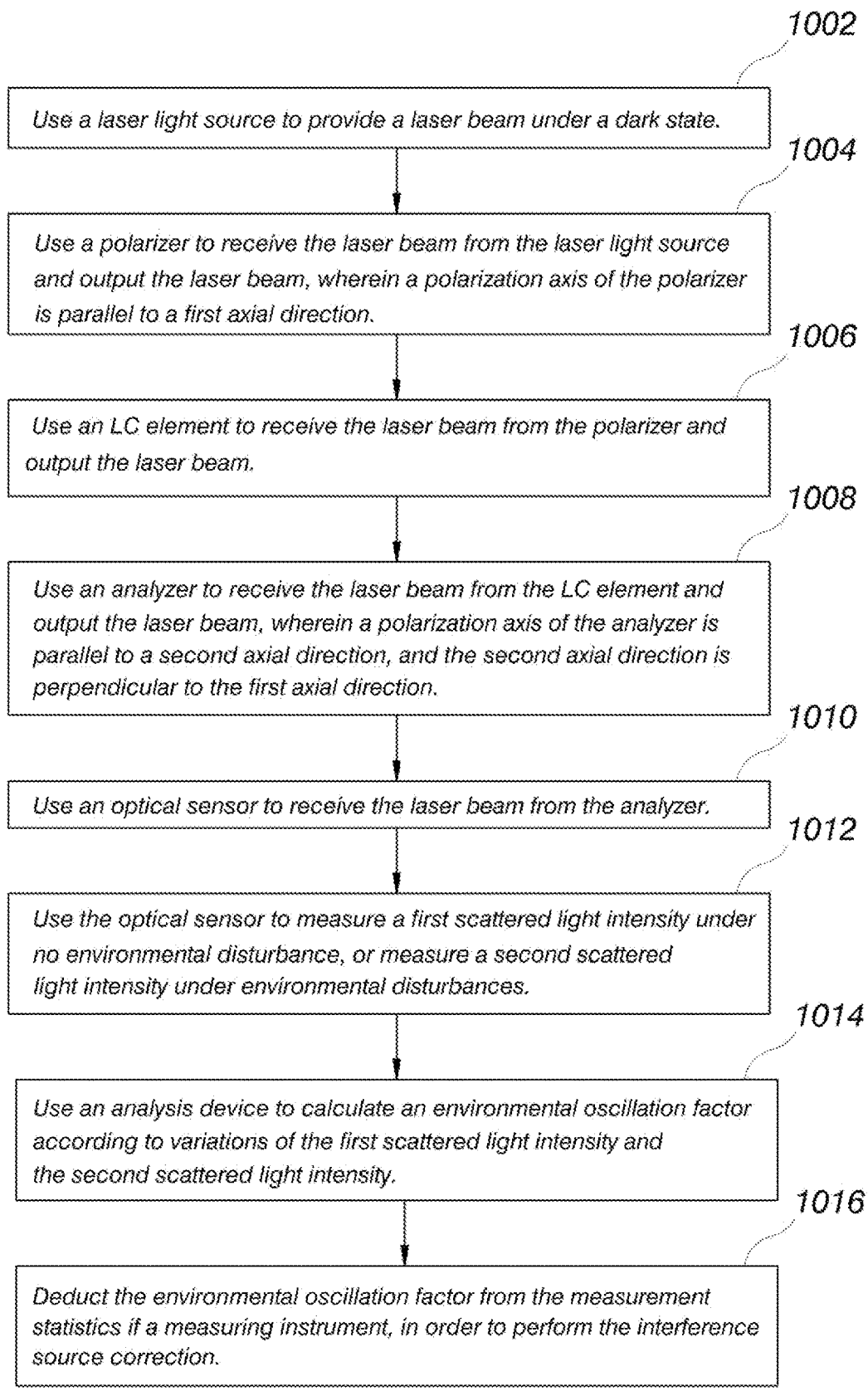
FIG. 10 is a flowchart illustrating an optical measurement method according to an embodiment of the present disclosure.

Please refer to FIG. 10, which is a flowchart illustrating an optical measurement method according to an embodiment of the present disclosure. Provided that a substantial result can be achieved, the steps shown in FIG. 10 are not necessary be executed by the sequential order. The method shown in FIG. 10 be may applied to the optical environmental oscillation detecting system 100 and the high-precision measuring instrument 50 shown in FIG. 8, and may be summarized as follows:

Step 1002: Use a laser light source to provide a laser beam under a dark mode;

Step 1004: Use a polarizer to receive the laser beam from the laser light source and output the laser beam, wherein a polarization axis of the polarizer is parallel to a first axial direction;

Step 1006: Use an LC element to receive the laser beam from the polarizer and output the laser beam;

Step 1008: Use an analyzer to receive the laser beam from the LC element and output the laser beam, wherein a polarization axis of the analyzer is parallel to a second axial direction, and the second axial direction is perpendicular to the first axial direction;

Step 1010: Use an optical sensor to receive the laser beam from the analyzer;

Step 1012: Use the optical sensor to measure a first scattered light intensity under no environmental disturbance, or measure a second scattered light intensity under environmental disturbances;

Step 1014: Use an analysis device to calculate at least one environmental oscillation factor according to variations of the first scattered light intensity and the second scattered light intensity; and Step 1016: Deduct said at least one environmental oscillation factor from the measurement statistics if a measuring instrument, in order to perform the interference source correction.

In view of the above, the present disclosure may control the polarization axis of the polarizer to be parallel to the optical axis of the LC element in the extraordinary light state, and control the polarization axis of the polarizer to be perpendicular to the optical axis of the LC element in the ordinary light state. The present disclosure may further use corresponding directive disturbance equations for measurement analysis, and perform environmental oscillation analysis according to the measurement and analysis result. The analytical statistics are sent back to high-precision measuring instrument in order to filter out said at least one environmental oscillation factor to increase the precision and reliability of instruments. Moreover, since the present disclosure adopts a pure optical method using the directive disturbance characteristics of the LC cells to realize the environmental oscillator, the desired effects can be achieved by using simple elements, such as the LC element 130, the laser light source 105, the polarizer 110, the analyzer 120 and the optical sensor 140. Without the use of expensive equipment, the present disclosure has advantage on costs. In addition, with the combination of the present disclosure and the high-precision measurement equipment, environmental oscillation factor signals can be obtained to remove the impact of the environmental oscillation, thus improving the authenticity and stability of measurement statistics.

What is claimed is:

1. An optical environmental oscillation detecting system, comprising:
   a laser light source, arranged to provide a laser beam;
   a polarizer, arranged on one side of the laser light source that outputs the laser beam, wherein the polarizer is arranged to receive the laser beam, and a polarization axis of the polarizer is parallel to a first axial direction;
   an analyzer, arranged on one side of the polarizer that is deviates from the laser light source, wherein a polarization axis of the analyzer is parallel to a second axial direction, and the second axial direction is perpendicular to the first axial direction;
   a liquid crystal (LC) element, arranged between the polarizer and the analyzer, wherein the LC element is arranged to receive the laser beam from the polarizer, and output the laser beam to the analyzer; and
   an optical sensor, arranged on one side of the analyzer that deviates from the LC element, to receive the laser beam outputted from the analyzer;
   wherein when there is no environmental disturbance, an alignment of LC cells in the LC element has an original pretilt angle, and when the LC element is in the dark mode, the optical sensor senses a first scattered light intensity of the laser beam outputted from the analyzer; and
   when there is environmental disturbance, the alignment of the LC cells has a changed pretilt angle in relative to the original pretilt angle, and when the LC element is in the dark mode, the optical sensor senses a second scattered light intensity of the laser beam outputted from the analyzer.

2. The optical environmental oscillation detecting system according to claim 1, further comprising an analysis device, wherein the optical sensor is coupled to the analysis device, and the analysis device is arranged to receive the first scattered light intensity and the second scattered light intensity, in order to calculate at least one environmental oscillation factor according to variations of the first scattered light intensity and the second scattered light intensity.

3. The optical environmental oscillation detecting system according to claim 2, wherein the analysis device is further coupled to a measuring instrument, and the measuring instrument is arranged to receive said at least one environmental oscillation factor, in order to deduct said at least one environmental oscillation factor from measurement statistics of the measuring instrument, for performing interference source corrections.

4. The optical environmental oscillation detecting system according to claim 1, wherein when the LC element is operated in an extraordinary light state, an optical axis of the LC element is parallel to the first axial direction.

5. The optical environmental oscillation detecting system according to claim 4, wherein when the LC element is operated in the extraordinary light state, the first axial direction is an X-axis direction, the second axial direction is a Y-axis direction, and a scattered light intensity of the LC element under the dark mode meets the following equation:

$$I^e_{scattered}(\theta_{ref}) = \frac{\pi^2}{\lambda^4 k_0^2}(\Delta\varepsilon)^2 k_B T \left\{ \frac{(n_o\sin\theta_f)^2}{K_{11}\{(n_o\cos\theta_f - n_{eff})^2 + (n_o\sin\theta_f)^2\}^2} + \frac{(n_o\cos\theta_f - n_{eff})^2}{K_{22}\{(n_o\cos\theta_f - n_{eff})^2 + (n_o\sin\theta_f)^2\}^2} \right\}$$

wherein $I^e_{scattered}$ denotes the scattered light intensity of the LC element in the extraordinary light state, $\theta_{ref}$ denotes a refraction angle, $\varepsilon$ denotes a dielectric constant, $k_0$ is a preset constant, T denotes a temperature, $K_{11}$ is a preset coefficient, $K_{22}$ denotes a twist elastic coefficient, $n_{eff}$ denotes an effective refractive index, $\theta_f$ denotes a final deflection angle, $k_B$ denotes the Boltzmann constant, $\lambda$ denotes a wavelength of the scattered light, and $n_0$ denotes a medium refractive index.

6. The optical environmental oscillation detecting system according to claim 1, wherein when the LC element is operated in an ordinary light state, an optical axis of the LC element is perpendicular to the first axial direction.

7. The optical environmental oscillation detecting system according to claim 6, wherein when the LC element is operated in the ordinary light state, the first axial direction is a Y-axis direction, the second axial direction is an X-axis direction, and a scattered light intensity of the LC element under the dark mode meets the following equation:

$$I^o_{scattered}(\theta_{ref}) = \frac{\pi^2}{\lambda^4 k_0^2}(\Delta\varepsilon)^2 k_B T \left( \frac{\cos^2\theta_f}{k_{22} \times (n_{eff}\cos\theta_f - n_o)^2 + k_{33} \times (n_{eff}\sin\theta_f)^2} \right)$$

wherein $I^o_{scattered}$ denotes the scattered light intensity under the ordinary light state, $\theta_{ref}$ denotes a refraction angle, $\varepsilon$ denotes a dielectric constant, $k_0$ is a preset constant, T denotes a temperature, $K_{22}$ denotes a twist elastic coefficient, $K_{33}$ denotes a bending deformation elastic coefficient, $n_{eff}$ denotes an effective refractive index, $\theta_f$ denotes a final deflection angle, $k_B$ denotes the Boltzmann constant, $\lambda$ denotes a wavelength of the scattered light, and $n_0$ denotes a medium refractive index.

8. The optical environmental oscillation detecting system according to claim 1, wherein a scattered light intensity of the LC element under the dark mode declines linearly with the variation of the angle of the LC cells therein.

9. The optical environmental oscillation detecting system according to claim 1, further comprising a rotative heating platform and a controller, wherein the LC element in arranged on the rotative heating platform, and the controller is coupled to the rotative heating platform.

10. An optical measurement method, comprising:
using a laser light source to provide a laser beam under a dark mode;
using a polarizer to receive the laser beam from the laser light source and output the laser beam, wherein a polarization axis of the polarizer is parallel to a first axial direction;
using an LC element to receive the laser beam from the polarizer and output the laser beam;
using an analyzer to receive the laser beam from the LC element and output the laser beam, wherein a polarization axis of the analyzer is parallel to a second axial direction, and the second axial direction is perpendicular to the first axial direction; and
using an optical sensor to receive the laser beam from the analyzer;
wherein when there is no environmental disturbance, an alignment of LC cells in the LC element has an original pretilt angle, and when the LC element is in the dark mode, the optical sensor senses a first scattered light intensity of the laser beam outputted from the analyzer; and
when there is environmental disturbance, the alignment of the LC cells has a changed pretilt angle in relative to the original pretilt angle, and when the LC element is in the dark mode, the optical sensor senses a second scattered light intensity of the laser beam outputted from the analyzer.

11. The optical measurement method according to claim 10, further comprising:
using an analysis device to receive the first scattered light intensity and the second scattered light intensity, in order to calculate at least one environmental oscillation factor according to variations of the first scattered light intensity and the second scattered light intensity.

12. The optical measurement method according to claim 11, further comprising:
using a measuring instrument to receive said at least one environmental oscillation factor, in order to deduct said at least one environmental oscillation factor from measurement statistics of the measuring instrument, for performing interference source corrections.

13. The optical measurement method according to claim 10, further comprising:
when the LC element is operated in an extraordinary light state, making an optical axis of the LC element parallel to the first axial direction.

14. The optical measurement method according to claim 13, wherein when the LC element is operated in the extraordinary light state, the first axial direction is an X-axis direction, the second axial direction is a Y-axis direction, and a scattered light intensity of the LC element under the dark mode meets the following equation:

$$I^e_{scattered}(\theta_{ref}) = \frac{\pi^2}{\lambda^4 k_0^2}(\Delta\varepsilon)^2 k_B T \left\{ \frac{(n_o\sin\theta_f)^2}{K_{11}\{(n_o\cos\theta_f - n_{eff})^2 + (n_o\sin\theta_f)^2\}^2} + \frac{(n_o\cos\theta_f - n_{eff})^2}{K_{22}\{(n_o\cos\theta_f - n_{eff})^2 + (n_o\sin\theta_f)^2\}^2} \right\}$$

wherein $I^e_{scattered}$ denotes the scattered light intensity of the LC element under the extraordinary light state, $\theta_{ref}$ denotes a refraction angle, $\varepsilon$ denotes a dielectric constant, $k_0$ is a preset constant, T denotes a temperature, $K_{11}$ is a preset coefficient, $K_{22}$ denotes a twist elastic coefficient, $n_{eff}$ denotes an effective refractive index, $\theta_f$ denotes a final deflection angle, $k_B$ denotes the Boltzmann constant, $\lambda$ denotes a wavelength of the scattered light, and $n_0$ denotes a medium refractive index.

15. The optical measurement method according to claim 10, further comprising:
when the LC element is operated in an ordinary light state, making an optical axis of the LC element perpendicular to the first axial direction.

16. The optical measurement method according to claim 15, wherein when operating in the ordinary light state, the first axial direction is a Y-axis direction, the second axial direction is an X-axis direction, and a scattered light intensity of the LC element under the dark mode meets the following equation:

$$I^o_{scattered}(\theta_{ref}) = \frac{\pi^2}{\lambda^4 k_0^2}(\Delta\varepsilon)^2 k_B T \left( \frac{\cos^2\theta_f}{k_{22} \times (n_{eff}\cos\theta_f - n_o)^2 + k_{33} \times (n_{eff}\sin\theta_f)^2} \right)$$

wherein $I^o_{scattered}$ denotes the scattered light intensity of the LC element under the ordinary light state, $\theta_{ref}$ denotes a refraction angle, $\varepsilon$ denotes a dielectric constant, $k_0$ is a preset constant, T denotes a temperature, $K_{22}$ denotes a twist elastic coefficient, $K_{33}$ denotes a bending deformation elastic coefficient, $n_{eff}$ denotes an effective refractive index, $\theta_f$ denotes a final deflection angle, $k_B$ denotes the Boltzmann constant, $\lambda$ denotes a wavelength of the scattered light, and $n_0$ denotes a medium refractive index.

17. The optical measurement method according to claim 10, wherein a scattered light intensity of the LC element under the dark mode declines linearly with the variation of the angle of the LC cells therein.

18. The optical measurement method according to claim 10, further comprising:
using a rotative heating platform to rotate the LC element, and using a controller to control the rotative heating platform.

* * * * *